United States Patent
Chen et al.

(10) Patent No.: US 10,696,006 B2
(45) Date of Patent: Jun. 30, 2020

(54) LAMINATION STRUCTURE OF TWO-AXIS CURVY TOUCH PANEL

(71) Applicants: INTERFACE TECHNOLOGY (CHENGDU) CO., LTD., Chengdu (CN); INTERFACE OPTOELECTRONICS (SHENZHEN) CO., LTD., Shenzhen (CN); GENERAL INTERFACE SOLUTION LIMITED, Miaoli County (TW)

(72) Inventors: Yun-Pei Chen, Shenzhen (CN); Chen-Hsing Huang, Shenzhen (TW)

(73) Assignees: INTERFACE TECHNOLOGY (CHENGDU) CO., LTD., Chengdu, Sichuan (CN); INTERFACE OPTOELECTRONICS (SHENZHEN) CO., LTD., Shenzhen, Guangdong (CN); GENERAL INTERFACE SOLUTION LIMITED, Miaoli County (TW)

( * ) Notice: Subject to any disclaimer, the term of this patent is extended or adjusted under 35 U.S.C. 154(b) by 271 days.

(21) Appl. No.: 15/601,120

(22) Filed: May 22, 2017

(65) Prior Publication Data

US 2018/0250912 A1    Sep. 6, 2018

(30) Foreign Application Priority Data

Mar. 2, 2017    (CN) .......................... 2017 1 0122919

(51) Int. Cl.
*B32B 3/02* (2006.01)
*B32B 7/12* (2006.01)
(Continued)

(52) U.S. Cl.
CPC .................. *B32B 3/02* (2013.01); *B32B 1/00* (2013.01); *B32B 7/12* (2013.01); *B32B 17/06* (2013.01);
(Continued)

(58) Field of Classification Search
CPC ............. H04M 1/0249; H04M 1/0283; H04M 1/0266; H04M 1/0277; G06F 3/0412;
(Continued)

(56) References Cited

U.S. PATENT DOCUMENTS

2009/0262411 A1 * 10/2009 Karmhag ........... B29D 11/0073
359/265
2010/0040843 A1 * 2/2010 Liao ..................... H04M 1/0283
428/203
(Continued)

FOREIGN PATENT DOCUMENTS

| CN | 104808843 A * | 7/2015 | |
| WO | WO-2015101701 A1 * | 7/2015 | ............. G06F 3/041 |
| WO | WO-2016035542 A1 * | 3/2016 | ............... B32B 7/02 |

OTHER PUBLICATIONS

Machine translation of CN 104808843A; obtained from ip.com (Year: 2020).*

*Primary Examiner* — Z. Jim Yang
(74) *Attorney, Agent, or Firm* — Rosenberg, Klein & Lee (57) ABSTRACT

A lamination structure of two-axis curvy touch panel includes a cover having a touch surface and an inner surface opposite to the touch surface, wherein the touch surface is a curved surface that protrudes from edge to center and has a long axis and a short axis. A transparent conduction module is flatly laminated to the inner surface of the cover to reduce a stress generated by laminating the transparent conduction module. A lamination area of said transparent conduction module is less than an area of the inner surface of the cover. The lamination structure of touch panel of the present (Continued)

invention applies to a two-axis curvy touch panel, wherein the cover is flatly laminated to the transparent conduction module to reduce stress values or improve stress concentration.

16 Claims, 8 Drawing Sheets (51) Int. Cl.
  B32B 17/06 (2006.01)
  B32B 27/36 (2006.01)
  B32B 27/32 (2006.01)
  G06F 3/041 (2006.01)
  H04M 1/02 (2006.01)
  G06F 1/16 (2006.01)
  B32B 1/00 (2006.01)
(52) U.S. Cl.
  CPC .......... *B32B 27/325* (2013.01); *B32B 27/365* (2013.01); *G06F 1/1626* (2013.01); *G06F 1/1637* (2013.01); *G06F 3/041* (2013.01); *H04M 1/0249* (2013.01); *B32B 2307/412* (2013.01); *B32B 2457/208* (2013.01); *G06F 2203/04103* (2013.01)
(58) Field of Classification Search
  CPC ....... G06F 1/1626; G06F 1/1637–1654; G06F 3/041–045; B32B 3/28; B32B 3/02; Y10T 428/24628; Y10T 428/24653; Y10T 428/24694–24736
  See application file for complete search history.

(56) References Cited

U.S. PATENT DOCUMENTS

| | | | | |
|---|---|---|---|---|
| 2010/0103138 A1* | 4/2010 | Huang | ................. | H05K 3/0067 345/174 |
| 2012/0032916 A1* | 2/2012 | Enoki | ..................... | G06F 3/044 345/174 |
| 2012/0111479 A1* | 5/2012 | Sung | ................. | B32B 17/10146 156/102 |
| 2012/0219701 A1* | 8/2012 | Wu | ........................ | G06F 3/044 427/58 |
| 2013/0335375 A1* | 12/2013 | Nishikawa | .............. | G06F 3/044 345/174 |
| 2014/0002975 A1* | 1/2014 | Lee | ......................... | B32B 37/18 361/679.01 |
| 2014/0233194 A1* | 8/2014 | Hongo | ................ | H05K 1/0283 361/749 |
| 2014/0345791 A1* | 11/2014 | Son | ..................... | H01L 51/0024 156/228 |
| 2014/0354558 A1* | 12/2014 | Cho | ....................... | G06F 3/0412 345/173 |
| 2014/0377508 A1* | 12/2014 | Oh | ......................... | B32B 27/36 428/174 |
| 2015/0185889 A1* | 7/2015 | Nakamura | .............. | G06F 3/041 345/173 |
| 2015/0268724 A1* | 9/2015 | Levesque | .............. | G06F 3/0488 345/156 |
| 2015/0346852 A1* | 12/2015 | Jiyama | .................... | G06F 3/041 345/173 |
| 2016/0124534 A1* | 5/2016 | Ahn | .................. | B32B 17/10146 345/173 |
| 2016/0162077 A1* | 6/2016 | Kiyoshi | ............... | C09D 181/08 345/174 |
| 2016/0236458 A1* | 8/2016 | Kim | ................... | B32B 37/0046 |
| 2016/0320873 A1* | 11/2016 | Makelainen | .......... | G06F 3/0416 |
| 2017/0108960 A1* | 4/2017 | Lee | ..................... | G06F 3/044 |
| 2017/0136727 A1* | 5/2017 | Miyamoto | .............. | G06F 3/044 |
| 2017/0139516 A1* | 5/2017 | Koike | ................... | B32B 27/325 |
| 2017/0249037 A1* | 8/2017 | Sato | ....................... | G06F 3/0412 |
| 2018/0039127 A1* | 2/2018 | Eom | ...................... | G02F 1/13338 |
| 2018/0217702 A1* | 8/2018 | Hashida | ................ | G06F 3/0412 |
| 2018/0279471 A1* | 9/2018 | Chen | ....................... | B32B 27/26 |
| 2019/0138136 A1* | 5/2019 | Nakayama | ............ | G06F 3/0446 |

* cited by examiner

LAMINATION STRUCTURE OF TWO-AXIS CURVY TOUCH PANEL

This application claims priority for China patent application no. 201710122919.1 filed on Mar. 2, 2017, the content of which is incorporated by reference in its entirety.

BACKGROUND OF THE INVENTION

Field of the Invention

The present invention relates to a lamination structure of a touch panel, particularly to a lamination structure of two-axis curvy touch panel.

Description of the Related Art

With the development of technology, the devices having touch functions are no longer novel products or technology. Since the products or technology having touch functions presently prevails everywhere, the display device with a touch panel has become one of key components of various electronic devices. A user can directly use a finger or a touch pen to press a screen to immediately control the display device with a touch panel.

Traditionally, a touch panel or a display panel is a flat panel. In a process of laminating the display panel and the touch panel to a cover, non-uniform stress is produced among all layers due to various lamination flaws, whereby the image displayed by the assembled touch display panel easily has non-uniform brightness to form color lumps or water ripples. More seriously, the touch sensing layer, the display panel or the cover will peel.

Figure 1A:
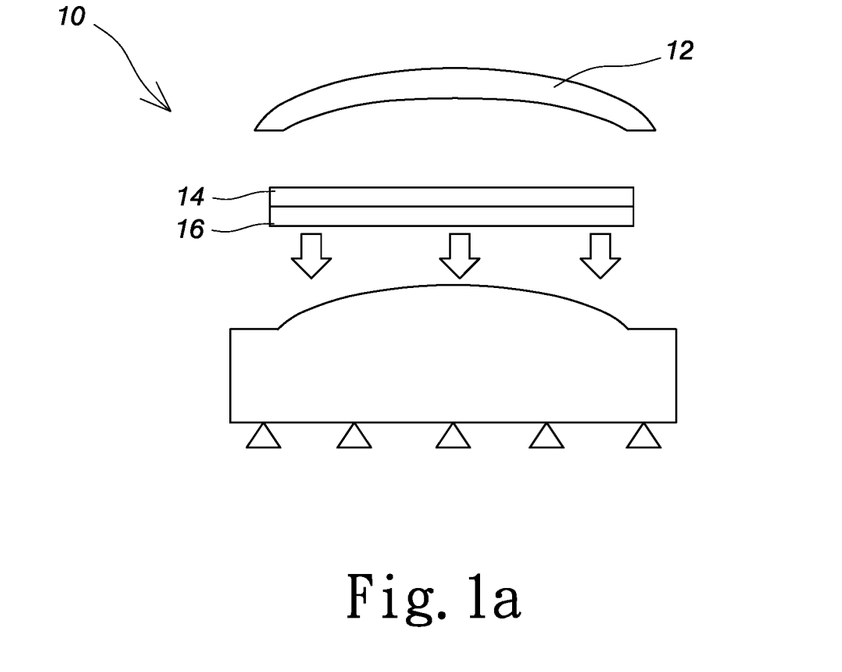
FIGS. 1a-1b are side views of a cover laminated to a transparent conduction layer of a touch panel in a conventional technology.
Figure 1B:
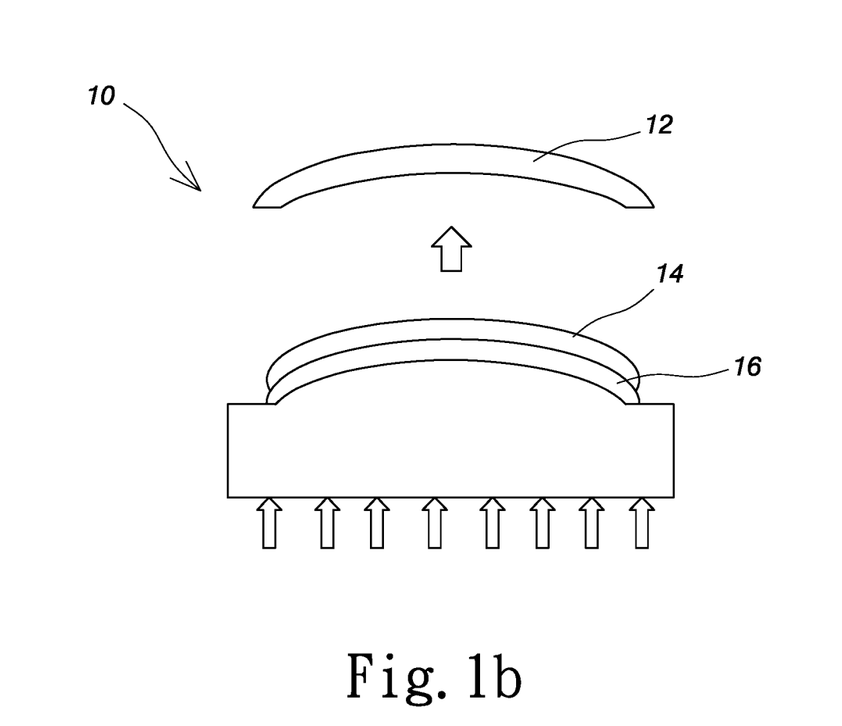
Figure 2:
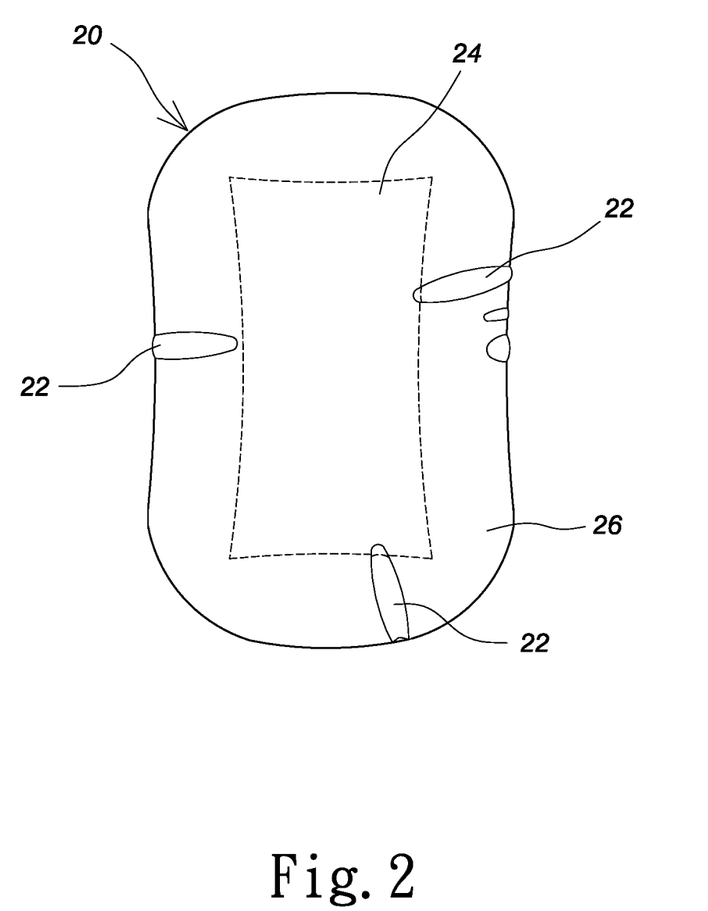
FIG. 2 is a bottom view of a laminated two-axis curvy cover having crease areas according to an embodiment of the present invention.

Refer to FIG. 1a and FIG. 1b. A conventional touch display panel consists of a flat touch panel laminated to a display panel. Unlike the conventional touch display panel, a present touch display panel 10 has a three-dimension curved surface. Only two side surfaces of the touch display panel 10 are curved. Take one side surface for example. When a three-dimension cover 12 is laminated to a transparent conduction layer 16 through an adhesive layer 14, the transparent conduction layer 16 and the adhesive layer 14 thereon are formed on a substrate 18 according to a shape of the substrate 18, and then the transparent conduction layer 16 is laminated to the cover 12 through the adhesive layer 14. The lamination process has to be more careful than a conventional lamination process of the touch display device. The stress condition of curved lamination area is stricter than that of flat lamination area. For example, during a lamination process, a rough lamination surface will be formed if the shape of the substrate 12 is somewhat not compatible with a shape of the transparent conduction layer 16. That is to say, a part of the transparent conduction layer 16 cannot be effectively laminated to the substrate 12, so that color lumps, water ripples or creases are formed on an edge of the transparent conduction layer 16. In addition, after a lamination process, creases are more easily formed on complicated three-dimension curved surfaces. Refer to FIG. 2. For example, when laminating a two-axis curvy cover 20, crease areas 22 are more easily formed if the lamination process is not careful. If the crease area 22 is too large, the touch sensitivity of a touch area 24 will be affected. Alternatively, when the cover 20 is laminated to a transparent conduction layer 26 for a period of time, the crease areas 22 easily make the transparent conduction layer 26 peel off the cover 20.

To overcome the abovementioned problems, the inventor of the present invention studies the technology of a touch panel and laminates a two-axis curvy touch panel to form a flat lamination structure, so as to effectively reduce stress values.

SUMMARY OF THE INVENTION

A primary objective of the present invention is to provide a lamination structure of two-axis curvy touch panel, which has a three-dimension cover different from a conventional plane, and a transparent conduction module is flatly laminated to the cover. A lamination area of the transparent conduction module laminated to the cover is less than an area of the cover to reduce the stress generated by a lamination process, whereby the laminated cover and the transparent conduction module cannot form creases to effectively overcome the problem with peeling off the lamination material.

Another objective of the present invention is to provide a lamination structure of two-axis curvy touch panel, wherein a cover and a transparent conduction module have novel designs. Due to a long axis and a short axis of the cover, any side surface of the cover is curved to provide a lamination structure of a touch panel different from the conventional technology.

To achieve the abovementioned objectives, the present invention provides a lamination structure of two-axis curvy touch panel, which includes a lamination structure of two-axis curvy touch panel, which comprises a cover having a touch surface and an inner surface opposite to the touch surface, and the touch surface is a curved surface that protrudes from edge to center and has a long axis and a short axis; and a transparent conduction module flatly laminated to the inner surface of the cover to reduce a stress generated by laminating the transparent conduction module to the cover, and a lamination area of the transparent conduction module is less than an area of the inner surface of the cover.

In an embodiment of the present invention, a length of the long axis of the cover is larger than a length which is five times a length of a vertical bisector of a short edge of the transparent conduction module, and a length of the short axis of the cover is larger than a length which is three times a length of the vertical bisector.

In an embodiment of the present invention, a length that a length of a short edge of the inner surface of the cover exceeds a length of the short edge of the transparent conduction module is ½ of a length of the vertical bisector, and a height difference between the short edge of the inner surface of the cover and the short edge of the transparent conduction module is ¹⁄₁₀ of a length of the vertical bisector, and a length that a length of a long edge of the inner surface of the cover exceeds a length of a long edge of the transparent conduction module is ¼ of a length of the vertical bisector, and a height difference between the long edge of the inner surface of the cover and the long edge of the transparent conduction module is ¹⁄₃₀ of a length of the vertical bisector.

In an embodiment of the present invention, the transparent conduction module has a shape of an ellipse or a rectangle. Alternatively, each of middles of four edge of a surface of the transparent conduction module has an arcuate recessed notch.

In an embodiment of the present invention, the transparent conduction module further comprises: a transparent conduction film arranged under the inner surface of the cover; and a transparent adhesive layer arranged on the transparent conduction film to adhere to the transparent conduction film and the inner surface of the cover.

In an embodiment of the present invention, the transparent conduction film comprises indium tin oxide (ITO), and the transparent adhesive layer comprises optically clear adhesive (OCA), and the cover is a glass cover or a plastic composite cover. Alternatively, the cover comprises polyethylene terephthalate (PET), polycarbonate (PC) or cycloolefin polymer (COP).

Below, the embodiments are described in detail in cooperation with the drawings to make easily understood the technical contents, characteristics and accomplishments of the present invention.

DETAILED DESCRIPTION OF THE INVENTION

In a touch device, a touch panel mainly consists of indium tin oxide (ITO) and optically clear adhesive (OCA). The market of touch panel trends from flat touch panel technology towards curved and flexible touch panel technology. A two-axis curvy touch panel will be the market trend in the future. The lamination process of the two-axis curvy touch panel plays an important role.

Figure 3:
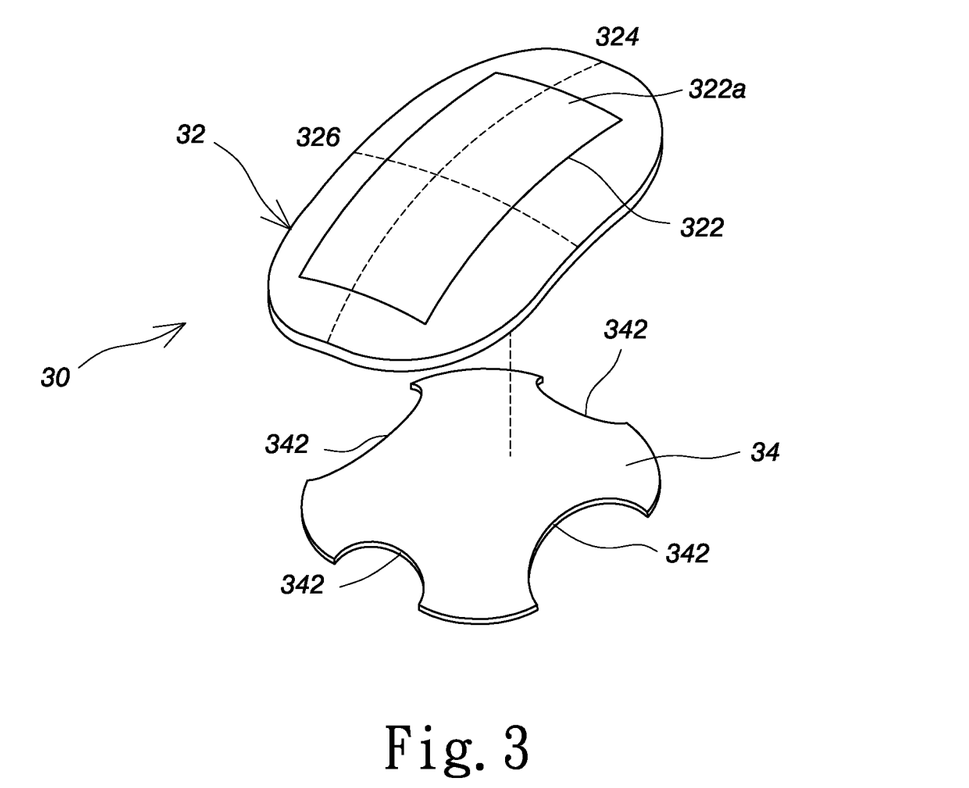
FIG. 3 is an exploded view of a lamination structure of two-axis curvy touch panel according to an embodiment of the present invention.
Figure 4:
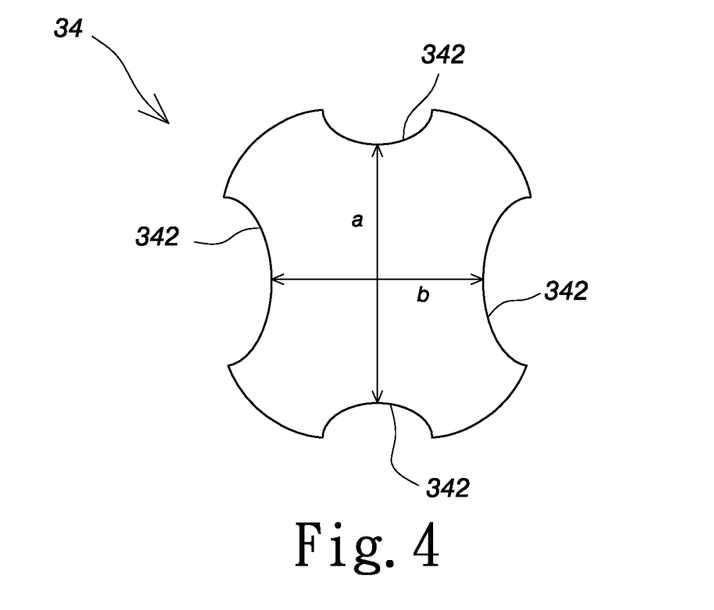
FIG. 4 is a planar diagram schematically showing a transparent conduction module according to the first embodiment of the present invention.
Figure 5A:
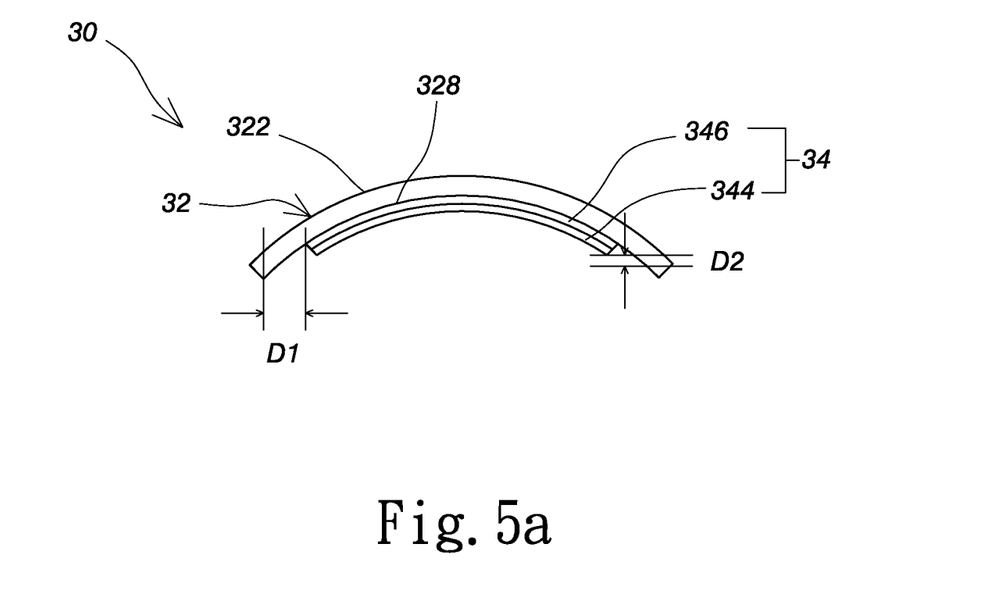
FIG. 5a is a side view of a short edge of a cover according to an embodiment of the present invention.
Figure 5B:
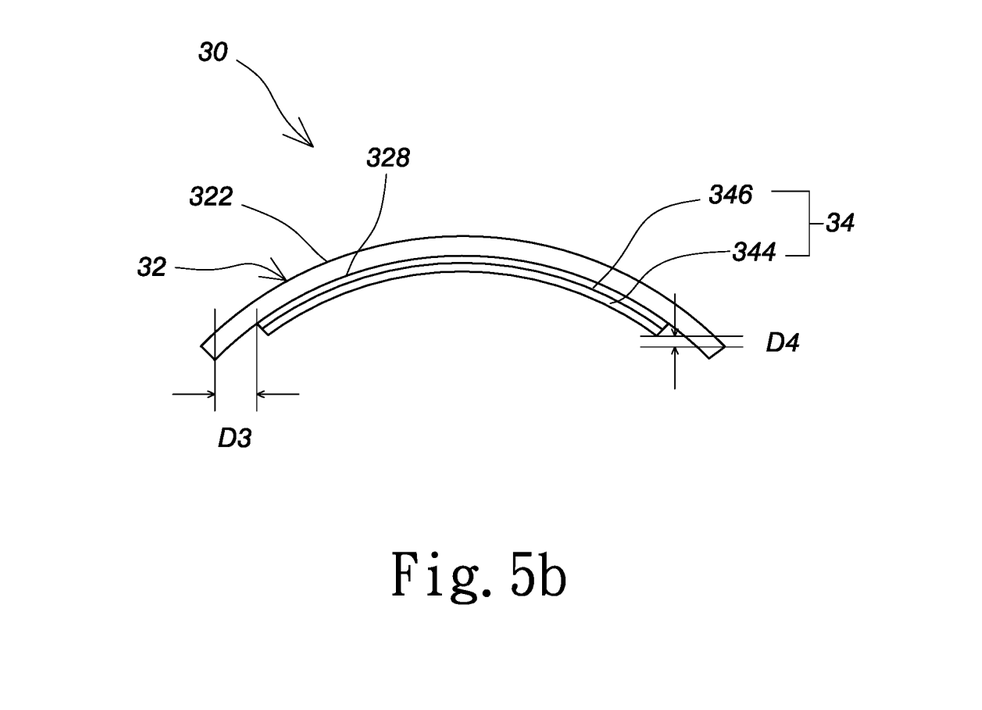
FIG. 5b is a side view of a long edge of a cover according to an embodiment of the present invention.

Refer to FIG. 3. A lamination structure 30 of two-axis curvy touch panel comprises a cover 32 and a transparent conduction module 34. The cover 32 has a touch surface 322, and the touch surface 322 is a curved surface that protrudes from edge to center and has a long axis 324 and a short axis 326. The touch surface 322 has a transparent touchable region 322a. As shown in FIG. 4, each of middles of four edge of a surface of the transparent conduction module 34 has an arcuate recessed notch 342. As shown in FIG. 5a and FIG. 5b, The cover 32 has the other surface which is an inner surface 328 opposite to the transparent conduction module 34.

The transparent conduction module 34 is flatly laminated to the inner surface 328 of the cover 32. A lamination area of the transparent conduction module 34 is less than an area of the inner surface 328 of the cover 32. In the embodiment, the transparent conduction module 34 further comprises a transparent conduction film 344 and a transparent adhesive layer 346. The transparent conduction film 344 is arranged under the inner surface 328 of the cover 32. The transparent adhesive layer 346 is arranged on the transparent conduction film 344 to adhere to the transparent conduction film 344 and the inner surface 328 of the cover 32. The cover 32 is a glass cover or a plastic composite cover. The cover 32 comprises polyethylene terephthalate (PET), polycarbonate (PC) or cycloolefin polymer (COP). The transparent conduction film 344 comprises indium tin oxide (ITO). The transparent adhesive layer 346 comprises optically clear adhesive (OCA).

Refer to FIG. 3 and FIG. 4 to detail a lamination condition of the cover 32 and the transparent conduction module 34. There is a vertical bisector a between two short edges of the transparent conduction module 34. There is a vertical bisector b between two long edges of the transparent conduction module 34. An intersection of the vertical bisector a and the vertical bisector b is a center of the transparent conduction module 34. A length of the long axis 324 of the cover 32 is larger than a length which is five times a length of the vertical bisector a of the short edge of the transparent conduction module 32, and a length of the short axis 326 of the cover 32 is larger than a length which is three times a length of the vertical bisector a. For example, the lengths of the long axis 324 and the short axis 326 of the cover 32 are respectively 200 mm and 120 mm.

Figure 6:
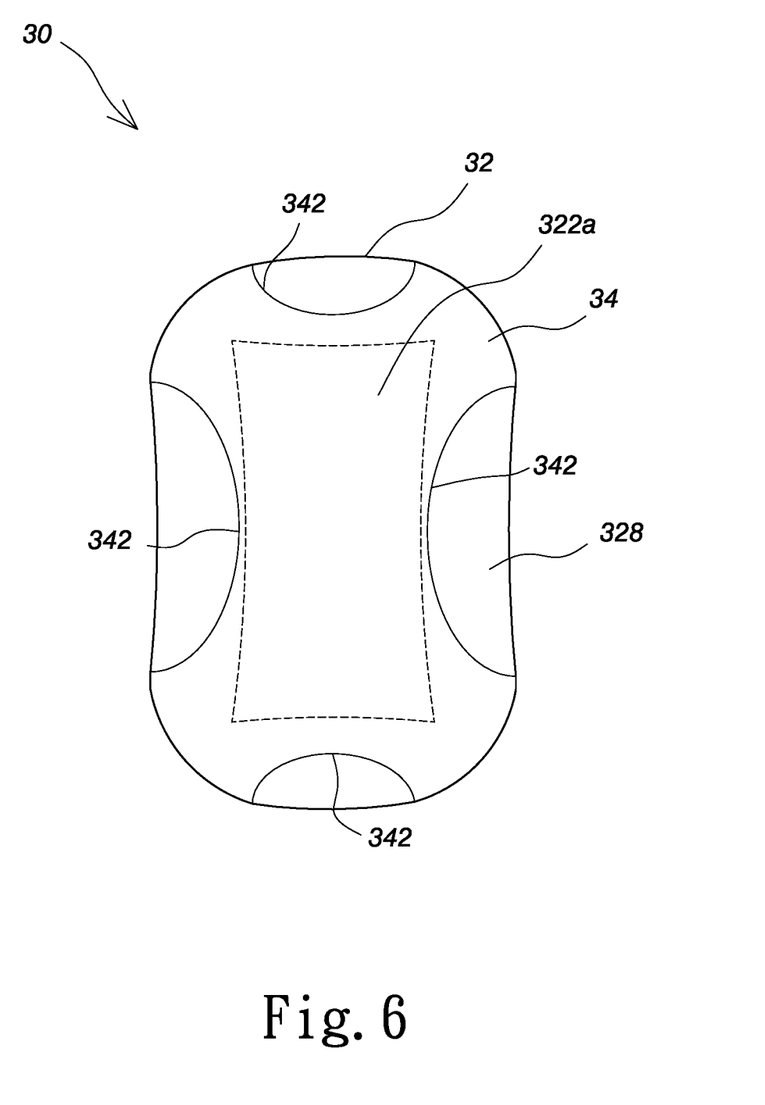
FIG. 6 is a bottom view of the transparent conduction module laminated to the cover according to the first embodiment of the present invention.

Continuing from the abovementioned description, refer to FIG. 5a. After the transparent conduction module 34 is laminated to the cover 32, a length D1 that a length of a short edge of the inner surface 328 of the cover 32 exceeds a length of the short edge of the transparent conduction module 34 is ½ of a length of the vertical bisector a, and a height difference D2 between the short edge of the inner surface 328 of the cover 32 and the short edge of the transparent conduction module 34 is 1/10 of a length of the vertical bisector a. Refer to FIG. 5b. A length D3 that a length of a long edge of the inner surface 328 of the cover 32 exceeds a length of a long edge of the transparent conduction module 34 is ¼ of a length of the vertical bisector a, and a height difference D4 between the long edge of the inner surface 328 of the cover 32 and the long edge of the transparent conduction module 34 is 1/30 of a length of the vertical bisector a. Refer to FIG. 6. FIG. 6 shows the transparent conduction module 34 laminated to the cover 32 and observed from bottom to top. Since the touchable region 322a of the cover 32 is transparent, the transparent touchable region 322a can be seen through the transparent conduction module 34 and the inner surface 328 from bottom to top. Instead of forming the crease areas (crease areas 22 in FIG. 2) of a conventional technology, the abovementioned size and ratio are used to explain the best embodiment of the present invention and form the best lamination structure. The present invention reduces the stress value generated by a lamination process to the minimum, lest the stress value be too large, thereby overcoming the problem with peeling off the lamination material.

Figure 7:
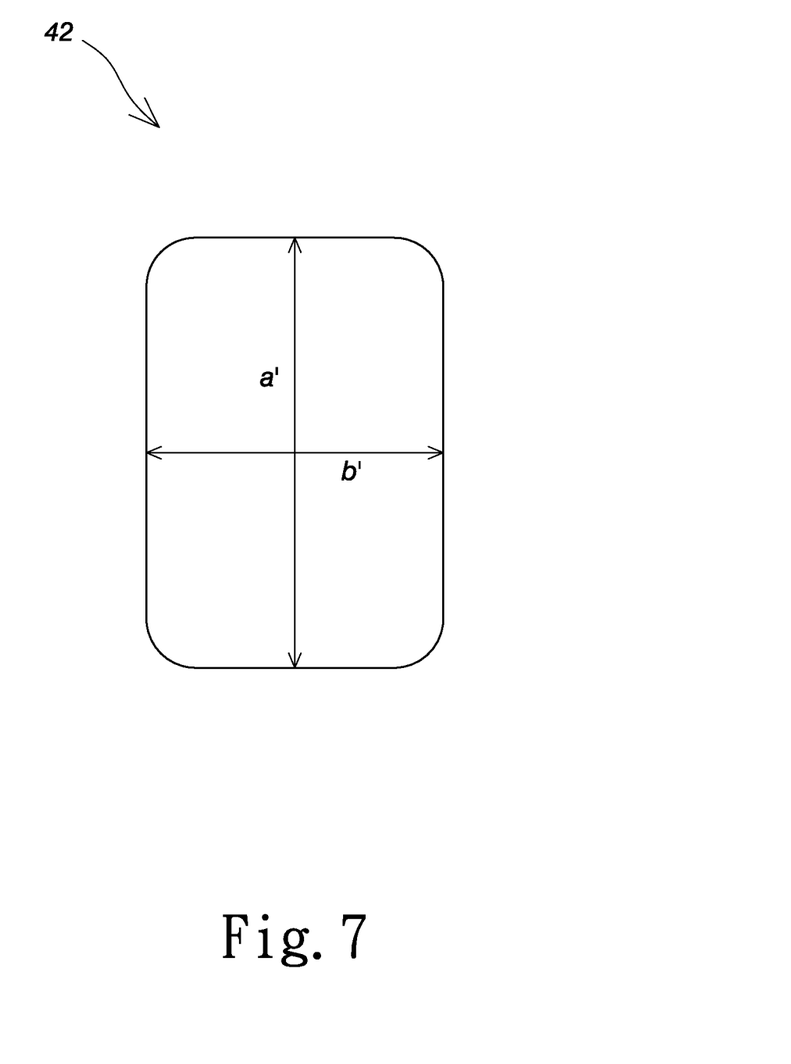
FIG. 7 is a planar diagram schematically showing a transparent conduction module according to the second embodiment of the present invention.
Figure 8:
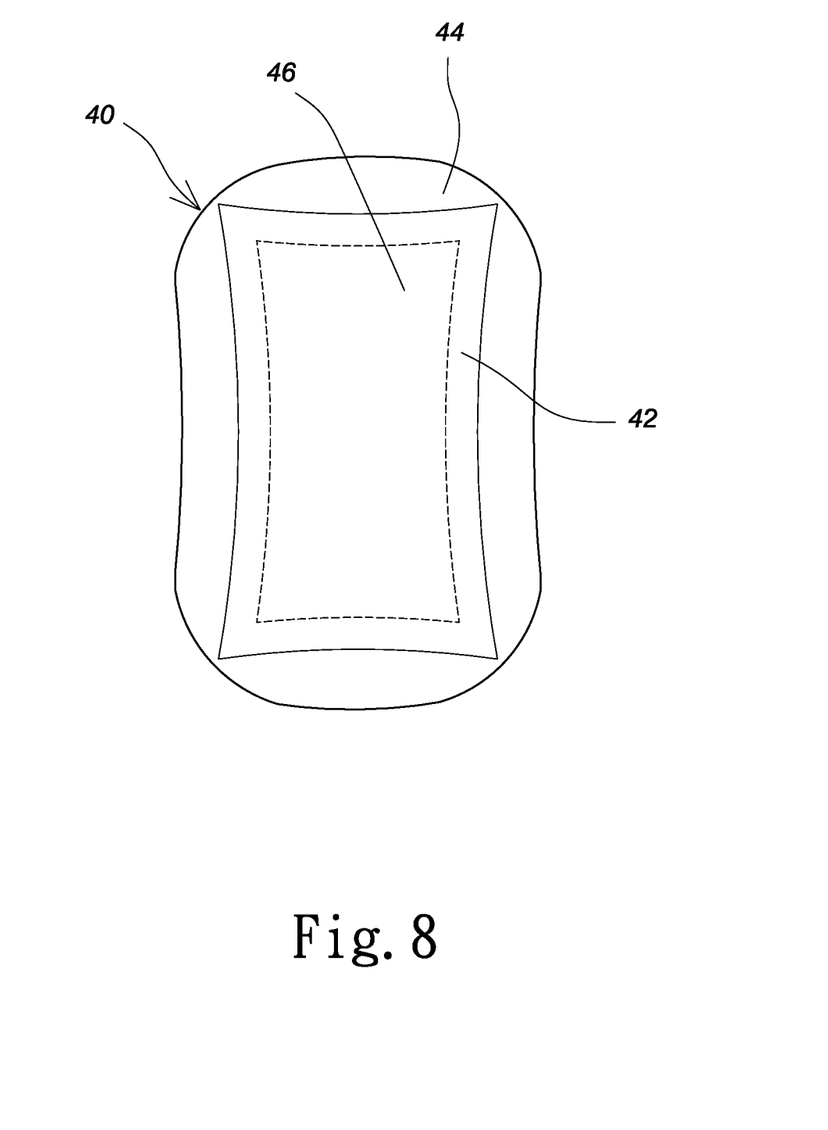
FIG. 8 is a bottom view of the transparent conduction module laminated to the cover according to the second embodiment of the present invention.

In addition to the abovementioned shape, the transparent conduction module of the present invention alternatively has a shape of a rectangle. Refer to FIG. 7 and FIG. 8. A transparent conduction module 42 having a shape of rectangle is arranged under a cover 40. On an inner surface 44 of the cover 40, a transparent touchable region 46 identical to the abovementioned embodiment is observed. There is a vertical bisector a' between two short edges of the transparent conduction module 42. There is a vertical bisector b' between two long edges of the transparent conduction module 42. An intersection of the vertical bisectors a' and b' is a center of the transparent conduction module 42. From FIG. 8, it is apparently observed that the stress generated by laminating the transparent conduction module 42 to the cover 40 is reduced and the crease areas of the conventional technology (crease areas 22 in FIG. 2) cannot be formed. Besides, a lamination area of the transparent conduction module 42 is less than an area of the inner surface of the cover 40. The lamination condition, the size and ratio of the cover 40 and the transparent conduction module 42 are identical to those of the abovementioned embodiment. For example, a length of a long axis of the cover 40 is larger than a length which is five times a length of the vertical bisector a' of the short edge of the transparent conduction module 42, and a length of a short axis of the cover 40 is larger than a length which is three times a length of the vertical bisector a'. After the transparent conduction module 42 is laminated to the cover 40, a length that a length of a short edge of the inner surface 44 of the cover 40 exceeds a length of the short edge of the transparent conduction module 42 is ½ of a length of the vertical bisector a', and a height difference between the short edge of the inner surface 44 of the cover 40 and the short edge of the transparent conduction module 42 is 1/10 of a length of the vertical bisector a'. A length that a length of a long edge of the inner surface 44 of the cover 40 exceeds a length of a long edge of the transparent conduction module 42 is ¼ of a length of the vertical bisector a', and a height difference between the long edge of the inner surface 44 of the cover 40 and the long edge of the transparent conduction module 42 is 1/30 of a length of the vertical bisector a'.

Figure 9A:
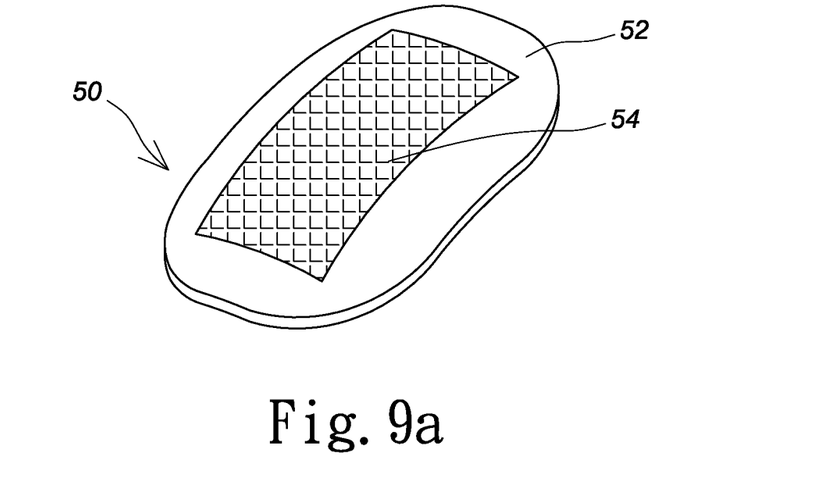
FIG. 9a is a perspective view of a fabricated touch panel according to an embodiment of the present invention.
Figure 9B:
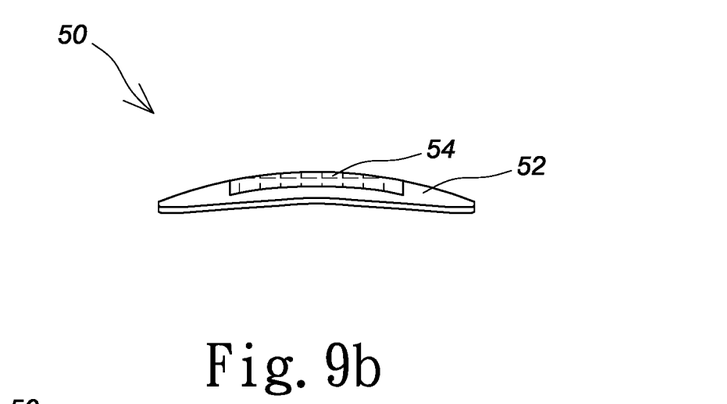
FIG. 9b is a side view of a short edge of the fabricated touch panel according to an embodiment of the present invention.
Figure 9C:
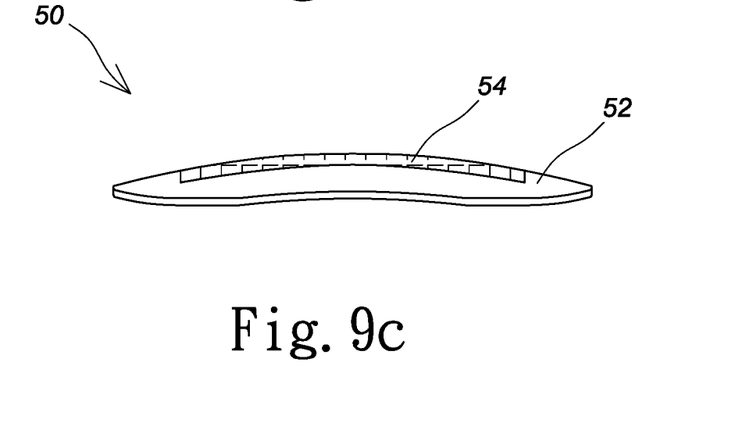
FIG. 9c is a side view of a long edge of the fabricated touch panel according to an embodiment of the present invention.

Refer to FIG. 9a. The transparent conduction module of the abovementioned embodiment is laminated to the cover and then combined with the other elements to produce a touch panel 50. From FIG. 9b, a short edge of the touch panel 50 is curvy. From FIG. 9c, a long edge of the touch panel 50 is also curvy. Thus, a two-axis curvy cover 52 is used to produce a touch panel different the conventional technology. Since a transparent conduction module of the touch panel 50 (not shown) is laminated to the cover 52 to reduce the stress value, crease areas do not be formed. As a result, the touch panel 50 does not peel, and the crease areas cannot affect a touchable region 54 of the touch panel 50 to avoid affecting the sensitivity of the touchable region 54.

Therefore, the present invention describes the lamination structure of the touch panel, which comprises a two-axis curvy cover having a long axis and a short axis and a transparent conduction module laminated thereon. Taking into consideration of the reduced lamination area of the transparent conduction module, the transparent conduction module can be flatly laminated to the cover to decrease the stress generated by a lamination process, thereby avoiding forming the crease areas. Thus, the laminated cover and the transparent conduction module cannot easily peel. In addition to the shapes of the two abovementioned embodiments, the transparent conduction module alternatively has a shape of an ellipse. As long as the size and ratio of the transparent conduction module satisfy the condition of the abovementioned embodiments, the lamination stress can be reduced.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A lamination structure of two-axis curvy touch panel comprising:
   a cover having a touch surface and an inner surface opposite to said touch surface, wherein said touch surface is a curved surface that protrudes from edge to center, and said cover has a long axis extending along the curved surface in a longitudinal direction and a short axis extending along the curved surface in a lateral direction; and
   a transparent conduction module laminated to said inner surface of said cover to reduce a stress generated by laminating said transparent conduction module to said cover, a peripheral contour of said transparent conduction module having a plurality of convex edges and a plurality of arcuate recessed notches alternating with said convex edges,
   wherein, after lamination of said transparent conduction module to said cover:
      each of said convex edges of said transparent conduction module is flush with a peripheral contour of said cover, and each of said arcuate recessed notches of said transparent conduction module is recessed from said peripheral contour of said cover,
      a lamination area of said transparent conduction module is less than an area of said inner surface of said cover,
      a length of said long axis of said cover is larger than five times a length of a vertical bisector extending between short edges of said transparent conduction module,
      a length of said short axis of said cover is larger than three times said length of said vertical bisector,
      a length of a straight line projection of said inner surface of said cover in the lateral direction exceeds a length of a straight line projection of said transparent conduction module in the lateral direction by ½ of said length of said vertical bisector,
      a height difference between respective lateral ends of said inner surface of said cover and said transparent conduction module is 1/10 of said length of said vertical bisector,
      a length of a straight line projection of said inner surface of said cover in the longitudinal direction exceeds a length of a straight line projection of said transparent conduction module in the longitudinal direction by ¼ of said length of said vertical bisector, and
      a height difference between respective longitudinal ends of said inner surface of said cover and said transparent conduction module is 1/30 of said length of said vertical bisector.

2. The lamination structure of two-axis curvy touch panel according to claim 1, wherein said peripheral contour of said transparent conduction module defines four arcuate recessed notches offset from one another.

3. The lamination structure of two-axis curvy touch panel according to claim 1, wherein said transparent conduction module includes:

a transparent conduction film arranged under said inner surface of said cover; and a transparent adhesive layer arranged on said transparent conduction film to adhere to said transparent conduction film and said inner surface of said cover.

4. The lamination structure of two-axis curvy touch panel according to claim 3, wherein said transparent conduction film comprises indium tin oxide (ITO).

5. The lamination structure of two-axis curvy touch panel according to claim 3, wherein said transparent adhesive layer comprises optically clear adhesive (OCA).

6. The lamination structure of two-axis curvy touch panel according to claim 1, wherein said cover is a glass cover or a plastic composite cover.

7. The lamination structure of two-axis curvy touch panel according to claim 1, wherein said cover comprises polyethylene terephthalate (PET), polycarbonate (PC) or cycloolefin polymer (COP).

8. A lamination structure of two-axis curvy touch panel comprising:

a cover having a touch surface and an inner surface opposite to said touch surface, said touch surface being a curved surface that protrudes from edge to center; and a transparent conduction module laminated to said inner surface of said cover to reduce a stress generated by laminating said transparent conduction module to said cover, a peripheral contour of said transparent conduction module having a plurality of convex edges and a plurality of arcuate recessed notches alternating with said convex edges, wherein, upon lamination of said transparent conduction module to said cover, each of said convex edges of said transparent conduction module is flush with a peripheral contour of said cover, and each of said arcuate recessed notches of said transparent conduction module is recessed from said peripheral contour of said cover.

9. The lamination structure of two-axis curvy touch panel according to claim 1, wherein said transparent conduction module has an elongated shape.

10. The lamination structure of two-axis curvy touch panel according to claim 8, wherein said transparent conduction module has an elongated shape.

11. The lamination structure of two-axis curvy touch panel according to claim 8, wherein said peripheral contour of said transparent conduction module defines four arcuate recessed notches offset from one another.

12. The lamination structure of two-axis curvy touch panel according to claim 8, wherein said transparent conduction module includes:

a transparent conduction film arranged under said inner surface of said cover; and a transparent adhesive layer arranged on said transparent conduction film to adhere to said transparent conduction film and said inner surface of said cover.

13. The lamination structure of two-axis curvy touch panel according to claim 12, wherein said transparent conduction film comprises indium tin oxide (ITO).

14. The lamination structure of two-axis curvy touch panel according to claim 12, wherein said transparent adhesive layer comprises optically clear adhesive (OCA).

15. The lamination structure of two-axis curvy touch panel according to claim 8, wherein said cover is a glass cover or a plastic composite cover.

16. The lamination structure of two-axis curvy touch panel according to claim 8, wherein said cover comprises polyethylene terephthalate (PET), polycarbonate (PC) or cycloolefin polymer (COP).

* * * * *